April 16, 1929.  R. WALLACE, JR  1,709,758
PULSATING APPARATUS FOR MILKING MACHINES
Filed Aug. 10, 1926

Inventor:-
Robert Wallace Jr.
by his Attorneys
Howson & Howson

Patented Apr. 16, 1929.

1,709,758

UNITED STATES PATENT OFFICE.

ROBERT WALLACE, JR., OF CASTLE DOUGLAS, SCOTLAND.

PULSATING APPARATUS FOR MILKING MACHINES.

Application filed August 10, 1926, Serial No. 128,477, and in Great Britain September 10, 1925.

This invention comprises an improved type of milking machine pulsator, designed chiefly for a machine in which there is a pulsator for each teat cup, but applicable also to a machine in which one pulsator controls the action of several teat cups, the teat cups in both cases being of a double walled type in which there is a rigid outer casing and a flexible inner wall.

My invention has for its object to provide an improved pulsator which will be very effective in operation and which can be easily cleaned.

According to my invention in double walled teat cups for milking machines the space between the outer wall and flexible inner wall is alternately placed under reduced pressure and atmospheric pressure by means of a pulsator having a reciprocating sliding valve member in which is located a ball, piston or the like, the valve member being moved in one direction when the space between the outer wall and inner flexible wall is under reduced pressure to allow the passage of air to said space, and the ball, piston or the like raised within said member by the inrushing air, and moved in the reverse direction when atmospheric pressure has been attained within said space by the impact of the ball, piston or the like falling within the valve member.

According to a preferred construction of my invention the pulsator is provided with a valve chamber, ducts or passages leading therefrom to the interior of the teat cup and to the space between the outer and inner walls thereof and provided with an air inlet port, a hollow sliding valve member located within said chamber and having openings at each end thereof, and a ball, piston or the like fitting loosely and capable of a limited movement within said valve member, the construction and arrangement being such that when the interior of the cup and said space are both under reduced pressure the valve member is raised and closes the passage or duct leading to the interior of the cup and uncovers said air inlet port, the inrushing air passing through the valve member, raising the ball, piston or the like located therein and passing to the said space, and when atmospheric pressure has been attained in said space the ball, piston or the like, falls and by impacting on the valve member moves the latter to again close the air inlet port and open the passage or duct leading to the interior of the cup.

In order that my invention may be properly understood, I have hereunto appended an explanatory sheet of drawings whereon:—

Figure 1:
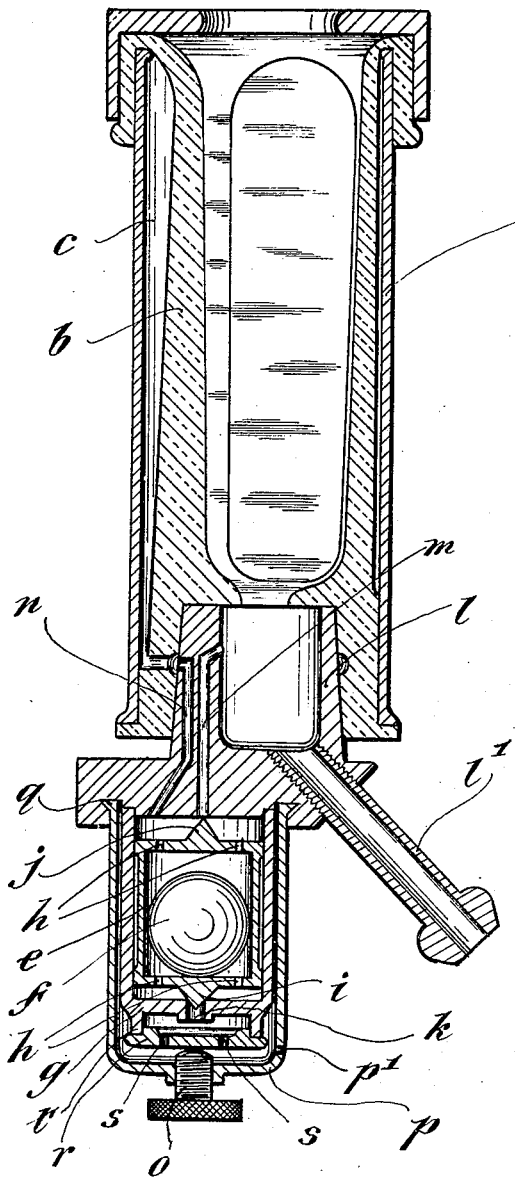
Figure 2:
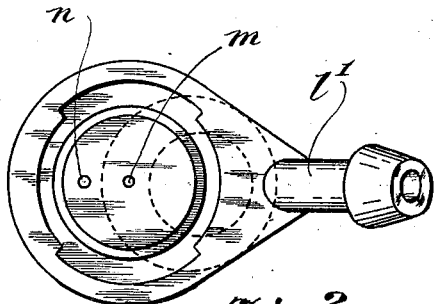

Figure 1 is a sectional elevation of a double walled teat cup having one embodiment of my improvements applied thereto and Figure 2 is an inverted plan view thereof with valve chamber removed.

Referring to the drawings:—

$a$ is the rigid outer wall of the teat cup, $b$ the flexible inner wall, $c$ the space between the teat and outer wall, $g$ the valve chamber, $e$ the sliding valve member and $f$ the ball located therein.

The teat cup is mounted on a plug $l$ to the base of which is secured a cylinder closed at its lower end and which constitutes the valve chamber $g$. Located and capable of a sliding movement within this chamber is the valve member $e$ which consists of a cylinder closed at both ends and perforated in the ends by air holes $h$. In the centre of each end is a conical projection $i$ and $j$ which constitute the valves proper.

Located and capable of a rising and falling movement within the valve member is the ball $f$.

In the center of the lower end of the valve chamber is an air inlet port $k$ which also forms a valve seat for the lower conical projection $i$.

In the teat cup plug $l$ are two passages or ducts $m$ and $n$ the former leading to the interior of the teat cup and the latter leading to the space $c$.

The lower end of passage $m$ forms a valve seat for the conical projection $j$.

The valve chamber $g$ is conveniently formed integral with its lower closed end and the other end thereof is butted against the teat cup plug $l$ making an air tight joint with it. It is kept against the plug by the pressure of a screw pin $o$ working through the end of an outer cylinder or casing $p$ which is anchored to the plug by a bayonet joint $q$, but any other means of jointing may be used. An air hole $p^1$ is provided in said outer casing. The inner end of said pin $o$ bears on cap $r$ having holes *s* and which cap bears on a downwardly projecting annular rim *t* formed on the lower end of the valve chamber.

In action the teat cup is vertical and the pulsator is underneath the teat cup; and the interior of the teat cup being connected by a connection $l^1$ carried by the plug and through pipings to a vacuum pump, is exhausted. In the "at-rest" position, the inner sliding valve member *e* and the ball *f* are in the lower position, so that the air inlet port *k* is closed by the conical projection *i* and the lower end of the passage *m* is uncovered.

When the teat cup is exhausted air is drawn from the space *c* through passage *n* and passage *m* until said space is exhausted to a predetermined extent.

The atmospheric pressure is then able to raise the valve member *e* so that the conical projection *i* is clear of its seat. When this state has been reached air rushes in through openings *s*, through the air inlet port *k* and in endeavouring to get through perforations *h* and restricted space between ball and valve member it carries valve member and ball to their higher position.

The conical projection *j* then closes the lower end of passage *m*.

Should the ball impact on the top end of the valve member before said passage is closed such impact serves to accelerate or effect the upward movement of the valve member.

Air continues to rush in until said space *c* of the teat cup is filled with air at atmospheric pressure after which the ball having no means of support drops to bottom of the valve chamber and by its impact overcomes the suction on valve *j* on upper end of valve member and drives down the latter until air inlet port *k* is closed and lower end of passage *m* is again uncovered.

The cycle of operations is now complete and there is continued repetition of the cycle so long as vacuum is maintained in the teat cup.

By first slackening the screw pin *o* and disconnecting the joint *q*, the outer casing, valve chamber, valve member and plug are all rendered accessible for cleaning.

It will be understood that in place of a ball I may provide a piston or other weighted member.

What I claim is:—

1. In double walled teat cups for milking machines a pulsator having a sliding valve member by which the space between the walls is placed under an alternating pressure and a weighted member capable of relative movement with respect to said valve member and adapted to impact thereon.

2. In double walled teat cups for milking machines a pulsator having a hollow valve member by which the space between the walls is placed under an alternating pressure and having an air passage therethrough, and a weighted member located within and capable of relative movement with respect to said valve member.

3. In double walled teat cups for milking machines a pulsator comprising a hollow sliding valve member by which the space between the walls is placed under an alternating pressure and a weight member making a working fit within the valve member and capable of a relative sliding movement therein.

4. In double walled teat cups, a plug in the bottom thereof, a valve casing secured to said plug and provided with an air inlet, said plug having passages leading from the said casing to the interior of the teat and from the casing to the space between the walls, a hollow sliding cylinder located within said valve casing and provided with an air hole in the top and bottom thereof, a conical projection on the top and bottom of said cylinder adapted to register with the passage leading to the interior of the casing and the air inlet in the valve casing respectively, and a weighted member located within and capable of a relative sliding movement with respect to said cylindrical member.

5. In double walled teat cups for milking machines a pulsator having a hollow valve member by which the space between the walls is placed under an alternating pressure and having an air passage therethrough, and a ball weighted member located within and capable of relative movement with respect to said valve member.

6. A pulsator for double walled teat cups comprising a valve casing having ports for the passage of air therethrough, a reciprocating valve member located within said casing and arranged to control the ports thereof, said valve member also having ports for the passage of air therethrough, and a weighted member located within said valve member, said weighted member being adapted to be raised relative to the valve member by the inrush of air through said casing and valve member and thereafter to fall and impact on said valve member and impart a quick movement thereto.

7. A pulsator for double walled teat cups comprising a valve casing having ports for the passage of air therethrough, a reciprocating hollow valve member located within said casing and arranged to control the ports of the casing, said valve member also having ports for the passage of air therethrough, and a weighted ball located within said valve member, said ball being adapted to be raised relative to the valve member by the inrush of air through said casing and valve member and thereafter to fall and impact on the latter.

8. A pulsator for double walled teat cups comprising a valve casing having ports at opposite ends thereof, a hollow reciprocating valve member located within said casing, conical protuberances on said member arranged to control the ports in the casing, said valve member also having ports for the passage of air therethrough, and a ball located within said valve member and arranged to be raised with respect thereto by the inrush of air through the casing and valve member and thereafter to fall and impact on the latter.

ROBERT WALLACE, Jr.